United States Patent [19]
Przygodzki et al.

[11] Patent Number: 5,203,520
[45] Date of Patent: Apr. 20, 1993

[54] HELICAR

[76] Inventors: Jozef Przygodzki, 202 Huron St. #3-L, Brooklyn, N.Y. 11222; George Spector, 233 Broadway, Rm. 3815, New York, N.Y. 10007

[21] Appl. No.: 783,574

[22] Filed: Oct. 28, 1991

[51] Int. Cl.$^5$ ............................................. B64C 37/00
[52] U.S. Cl. .................................. 244/2; 244/17.19; 244/17.21; 244/7 R
[58] Field of Search .................. 244/2, 7 R, 7 A, 7 C, 244/17.19, 17.21

[56] References Cited

U.S. PATENT DOCUMENTS

| | | | |
|---|---|---|---|
| 2,110,563 | 3/1938 | Thaon | 244/2 |
| 2,135,073 | 11/1938 | Gerhardt et al. | 244/2 |
| 2,464,285 | 3/1949 | Andrews | 244/7 R |
| 2,573,271 | 10/1951 | Perl | 244/2 |
| 2,940,688 | 6/1960 | Bland | 244/2 |
| 3,116,896 | 1/1964 | Sigler et al. | 244/2 |
| 3,589,647 | 6/1971 | Burkham | 244/17.21 |
| 3,606,571 | 9/1971 | Wood | 244/7 R |
| 5,050,817 | 9/1991 | Miller | 244/2 |

FOREIGN PATENT DOCUMENTS 3900096 7/1989 Fed. Rep. of Germany .......... 244/2

*Primary Examiner*—Galen Barefoot
*Assistant Examiner*—Anne E. Bidwell

[57] ABSTRACT

A helicar is provided which consists of a body being in the shape of an automobile, a plurality of wheels depending from the body for supporting the body on the ground, a top rotor assembly operatively secured to the body, a rear rotor assembly operatively secured to the body and a mechanism for operating the top rotor assembly and the rear rotor assembly in a helicopter mode for travel through the air and for operating the wheels in an automobile mode for travel on the ground.

4 Claims, 3 Drawing Sheets

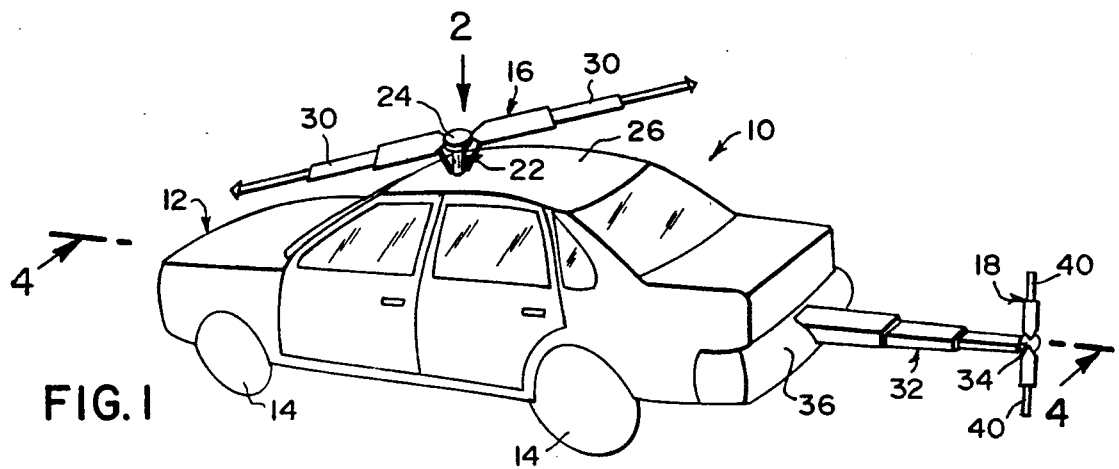
FIG. 1
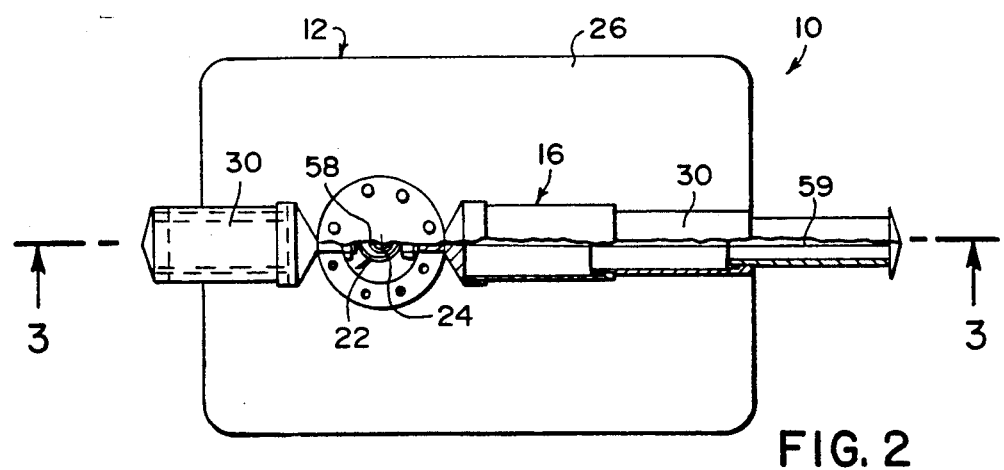
FIG. 2
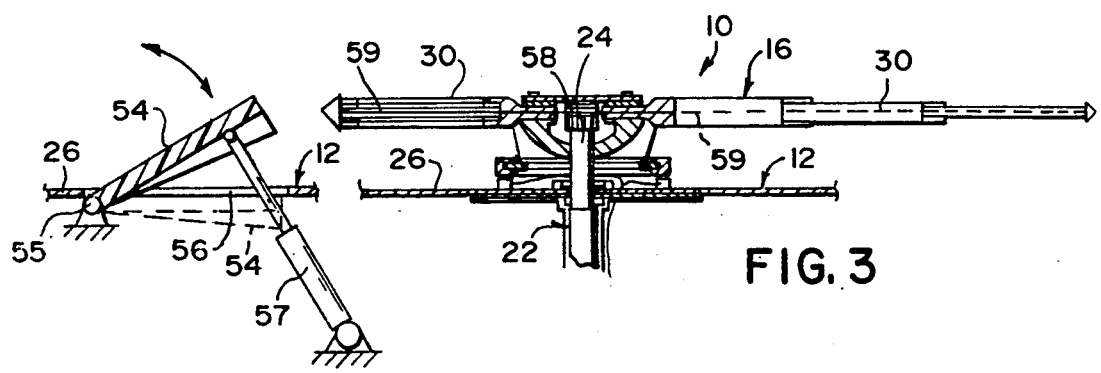
FIG. 3
FIG. 3A

HELICAR

BACKGROUND OF THE INVENTION

The instant invention relates generally to transportation vehicles and more specifically it relates to a helicar which provides a vehicle that can operate as a helicopter in the air and an automobile on the ground.

There are available various conventional transportation vehicles which do not provide the novel improvements of the invention herein disclosed.

SUMMARY OF THE INVENTION

A primary object of the present invention is to provide a helicar that will overcome the shortcomings of the prior art devices.

Another object is to provide a helicar which is a vehicle that includes a mechanism which can convert the vehicle in a helicopter mode, so it can travel through the air and then convert the vehicle into an automobile mode, so it can travel on the ground.

An additional object is to provide a helicar that includes an air deflector which can be activated when the helicar is in its automobile mode.

A further object is to provide a helicar that is simple and easy to use.

A still further object is to provide a helicar that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic perspective view of the instant invention in a helicopter mode.

FIG. 2 is a diagrammatic top view with parts broken away taken in direction of arrow 2 in FIG. 1, showing the top rotor assembly in greater detail.

FIG. 3 is a diagrammatic cross sectional view taken along line 3—3 in FIG. 2.

FIG. 3A is a diagrammatic cross sectional view showing an adjustable curved air deflector in front of the top rotor assembly to be utilized when the instant invention is in an automobile mode.

DETAILED DESCRIPTION OF THE PREFERRED EMBODIMENTS

Figure 4:
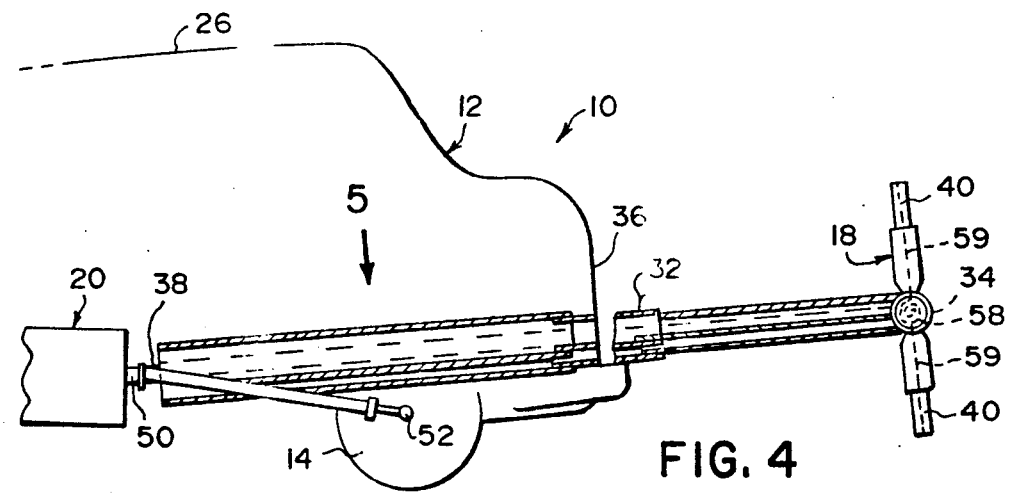
FIG. 4 is a diagrammatic cross sectional view taken along line 4—4 in FIG. 1 showing the rear rotor assembly.
Figure 5:
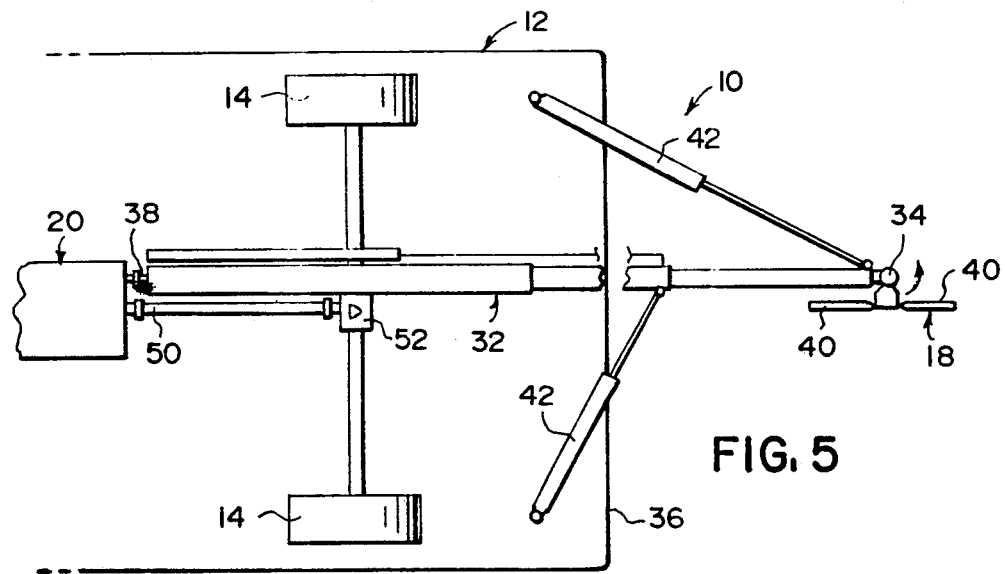
FIG. 5 is a diagrammatic top view as indicated by arrow 5 showing the rear rotor assembly in the opened position.
Figure 6:
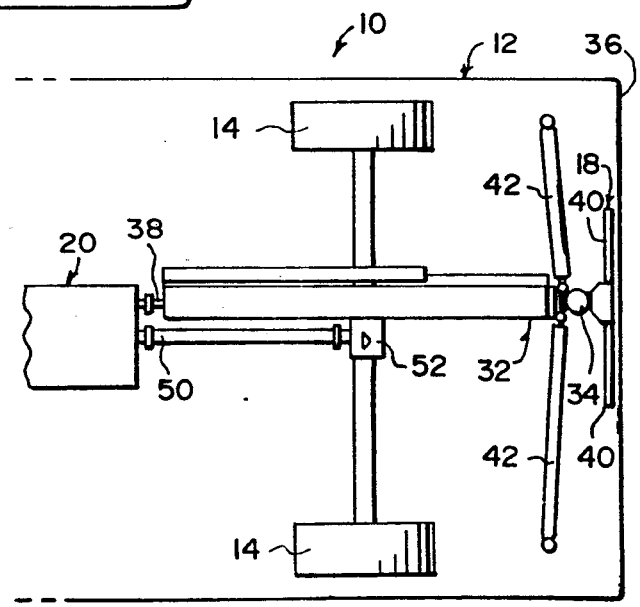
FIG. 6 is a diagrammatic top view similar to FIG. 5 showing the rear rotor assembly in the closed retracted stored position when in the automobile mode.
Figure 7:
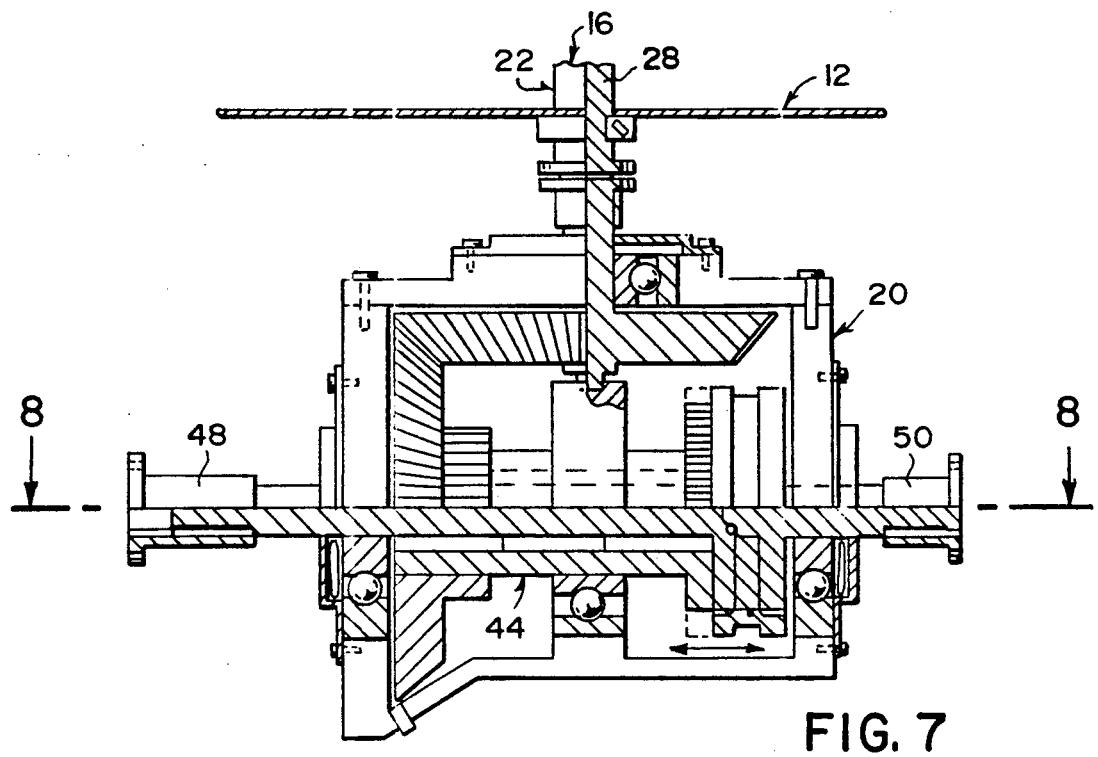
FIG. 7 is a diagrammatic cross sectional view of the drive gear train assembly showing the drive mechanism for the top rotor assembly.
Figure 8:
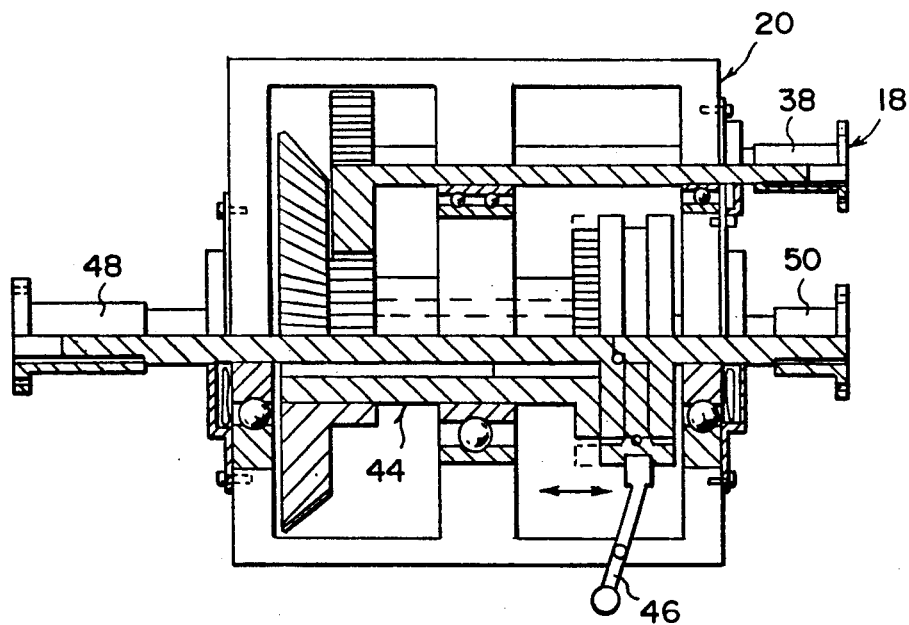
FIG. 8 is a diagrammatic cross sectional view taken along line 8—8 in FIG. 7 showing the drive mechanism for the rear rotor assembly.

Turning now descriptively to the drawings, in which similar reference characters denote similar elements throughout the several views, the Figures illustrate a helicar 10 which consists of a body 12 being in the shape of an automobile. A plurality of wheels 14 depend from the body 12 for supporting the body 12 on the ground. A top rotor assembly 16 is operatively secured to the body 12. A rear rotor assembly 18 is operatively secured to the body 12. A mechanism 20 is for operating the top rotor assembly 16 and the rear rotor assembly 18 in a helicopter mode for travel through the air and for operating the wheels 14 in an automobile mode for travel on the ground.

The top rotor assembly 16 includes a vertical rotor shaft 2 having a first end 24 extending upwardly through the roof 26 of the body 12 and a second end 28 connected to the operating mechanism 20 and a pair of adjustable main rotor blades 30 are operatively connected to the first end 24 of the vertical rotor shaft 22, so that the main rotor blades 30 can collapse towards the vertical rotor shaft 22 when the helicar 10 goes into the automobile mode. The main rotor blades 30 can extend away from the vertical rotor shaft 22 when the helicar 10 goes into the helicopter mode due to centrifugal force and will retract due to spring 58 and cord 59.

The rear rotor assembly 18 includes a horizontal collapsible rotor shaft 32 having a first end 34 extending outwardly through a rear portion 36 of the body 12 and a second end 38 connected to the operating mechanism 20. A pair of adjustable tail rotor blades 40 are operatively connected to the first end 34 of the horizontal rotor shaft 32, so that the tail rotor blades 40 can collapse towards the horizontal rotor shaft 32, while the horizontal rotor shaft 32 can collapse inwardly through the rear portion 36 of the body 12 when the helicar 10 goes into the automobile mode. The horizontal rotor shaft 32 can extend outwardly through the rear portion 36 of the body 12, while the tail rotor blades 40 can extend away from the horizontal rotor shaft 32 when the helicar 10 goes into the helicopter mode. A pair of hydraulic pistons 42 can be utilized to help move the horizontal rotor shaft 32 in the body 12.

The operating mechanism 20 includes a drive gear train assembly 44 with a gear shift lever 46. The drive gear train assembly 44 is connected to a drive shaft 48 from an engine (not shown), a driven shaft 50 to a differential 52 for the rear wheels 14, the second end 28 of the vertical rotor shaft 22 of the top rotor assembly 16 and the second end 38 of the rear rotor assembly 32. When the gear shift lever 46 is shifted to a first position which is in the automobile mode, the drive gear train assembly 44 will operate the differential 52. When the gear shift lever 46 is shifted to a second position which is in the helicopter mode, the drive gear train assembly 44 will operate the top rotor assembly 16 and the rear rotor assembly 18.

In FIG. 3A the helicar 10 further includes an adjustable curved air deflector 54 pivotally mounted at 55 within a recess 56 in the roof 26 of the body 12 to be raised by an hydraulic piston 57. When the helicar 10 is in the automobile mode, so as to block the main rotor blades 30 and lowered when the helicar 10 is in the helicopter mode.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A helicar which comprises:
   a) a body with a longitudinal axis in the shape of an automobile;
   b) a plurality of wheels on an axle rotating on a second axis perpendicular to the first said axis depending from said body for supporting said body on the ground;
   c) a top rotor assembly operatively secured to said body about a third axis perpendicular to the first two said axes;
   d) a rear rotor assembly operatively secured to said body;
   e) means for operating said top rotor assembly and said rear rotor assembly in a helicopter mode for travel through the air and for operating said wheels in an automobile mode for travel on the ground; said means comprising a drive shaft parallel to said longitudinal axis, said top rotor assembly includes:
   f) a vertical rotor shaft having a first end extending upwardly through the roof of said body and a second end connected to said operating means; and
   g) a par of main rotor blades operatively connected to the first end of said vertical rotor shaft, so that said main rotor blades can collapse towards said vertical rotor shaft when said helicar goes into the automobile mode and said main rotor blades can extend away from said vertical rotor shaft when said helicar goes into the helicopter mode.

2. A helicar as recited in claim 1, wherein said rear rotor assembly includes:
   a) a horizontal collapsible rotor shaft having a first end extending outwardly through a rear portion of said body and a second end connected to said operating means;
   b) a pair of adjustable tail rotor blades operatively connected to said first end of said horizontal rotor shaft, so that said tail rotor blades can collapse towards said horizontal rotor shaft, while said horizontal rotor shaft can collapse inwardly through the rear portion of said body when said helicar goes into the automobile mode and said horizontal rotor shaft can extend outwardly through the rear portion of said body while said tail rotor blades can extend away from said horizontal rotor shaft when said helicar goes into the helicopter mode; and
   c) a rear wheel shaft connected at one end to said operating means and at another end connected to said axle.

3. A helicar as recited in claim 2, wherein said operating means includes a drive gear train assembly with a gear shift lever, said drive gear train assembly is connected to; a drive shaft from an engine; said rear wheel shaft to a differential connected to said axle of said rear wheels; said second end of said vertical rotor shaft of said top rotor assembly; and said second end of said rear rotor assembly, so that when said gear shift lever is shifted to a first position which is in the automobile mode, said drive gear train assembly will operate the differential and when said gear shift lever is shifted to a second position which is in the helicopter mode, said drive gear train assembly will operate said top rotor assembly and said rear rotor assembly; wherein said rear wheel shaft is parallel to said horizontal rotor shaft.

4. A helicar as recited in claim 3, further including an adjustable air deflector pivotally mounted within a recess in the roof forward of aid top rotor assembly for deflecting air above said top rotor assembly to reduce air resistance when in the automobile mode.

* * * * *